Aug. 23, 1938. T. L. GATKE 2,128,087
SELF LUBRICATING BEARING
Filed June 10, 1936 2 Sheets-Sheet 1
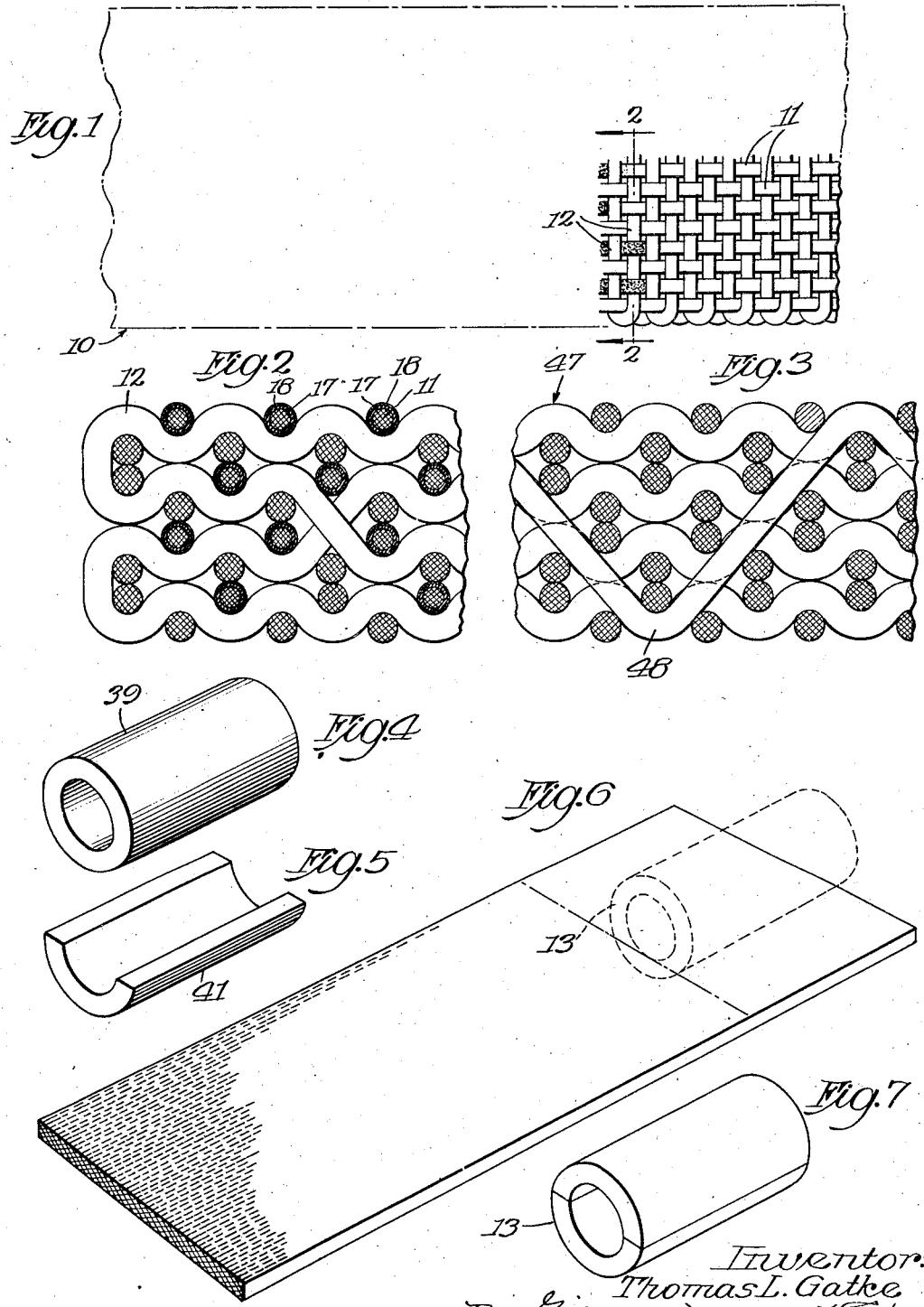

Aug. 23, 1938.　　　T. L. GATKE　　　2,128,087
SELF LUBRICATING BEARING
Filed June 10, 1936　　　2 Sheets-Sheet 2
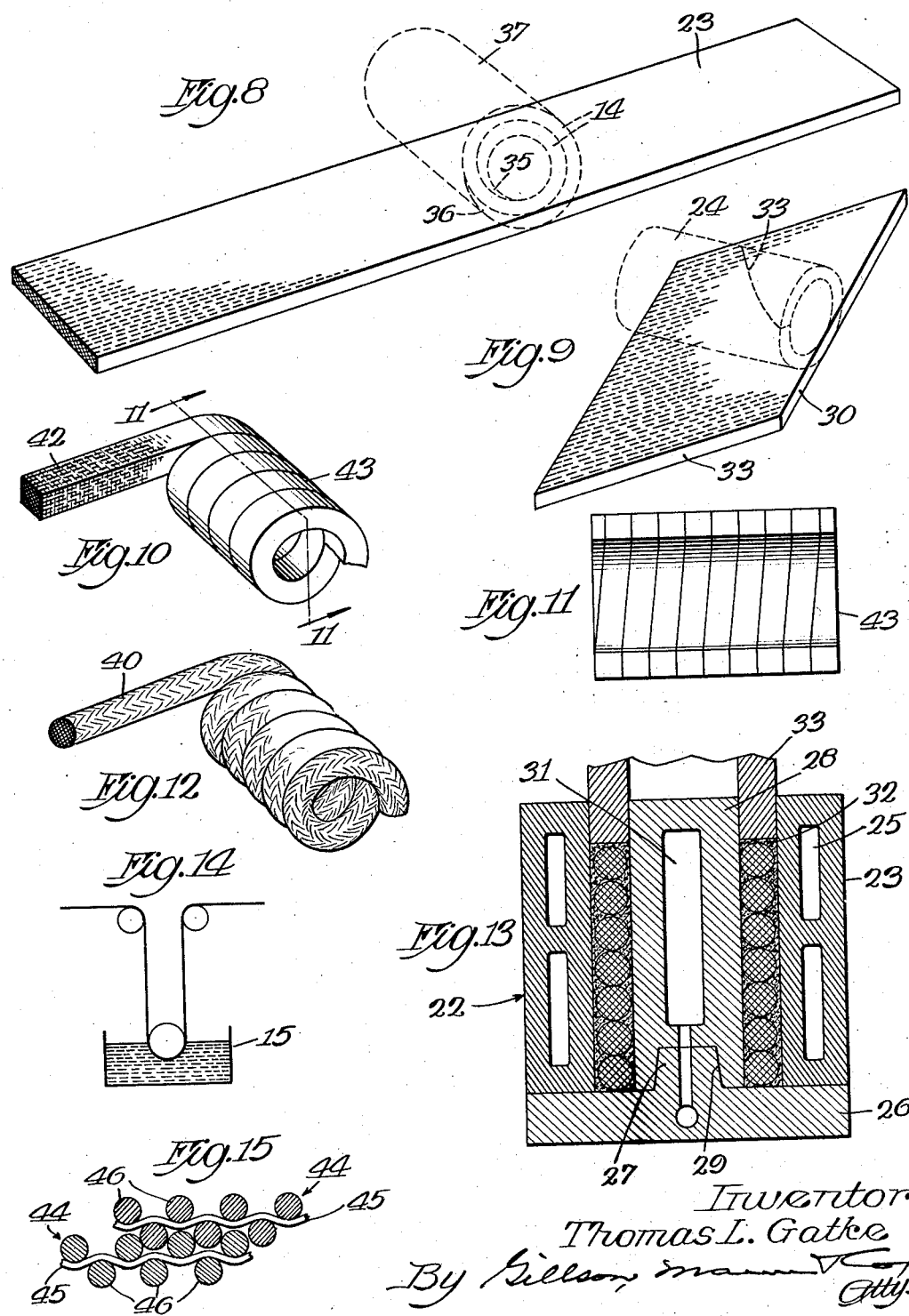

Patented Aug. 23, 1938

2,128,087

UNITED STATES PATENT OFFICE 2,128,087

SELF-LUBRICATING BEARING

Thomas L. Gatke, Chicago, Ill.

Application June 10, 1936, Serial No. 84,423

2 Claims. (Cl. 308—238)

It has been proposed to make self-lubricating bearings of fibrous material, a lubricant and a binder that will harden under heat and pressure, or otherwise, but all of the schemes that have come to my attention (and I have made quite a study of the subject) fall short of the aim.

Some coat, or impregnate their sheets of woven fabric with a mixture of graphite and synthetic or natural resin, pile them in stacks with, or without additional resin, and cure the mass under pressure (and heat if appropriate). The thin sheets are thinner after being pressed and the bearing becomes, in fact, a stack of very thin laminations bound only by the cured resin, or other binder, which has become weakened throughout in direct proportion to the amount of lubricant contained; and, hence, the bearing is cut through, in effect, with as many planes of natural cleavage as there are sheets (less one) and the first is removed from the actual bearing surface by little more than the thinness of one sheet.

From this statement it follows that the scheme of self-lubrication results in a corresponding degree of inherent weakness that limits the life and the uses of the bearings so made.

It has been proposed to insert the lubricant by giving warp or woof strands of the fabric sheets a preliminary treatment with graphite suspended in a highly volatile solvent such as gasoline, or ether, which passed off, or was driven off, before the thread reached the loom. The result was even worse than the first mentioned schemes, for in the weaving operation (and the handling after the solvent was gone) the graphite, being free, scattered throughout and all over the fabric, inhibiting any proper binding action of the subsequently applied resin.

It has also been proposed to form the bearing from fabric, such as duck, by passing the duck through an adhesive containing graphite preparatory to the molding operation but the graphite, being distributed over the entire surfaces of the layers of fabric, prevents the maximum adhesion between the different layers, and in use, the bearing tends to become delaminated.

The quest for a better bearing has been long and the proposed schemes numerous. Those mentioned illustrate their character and some of the defects. It is the object of this invention to overcome the past difficulties and this is achieved, mainly, by one of two expedients, or by both. First, after applying the lubricant to a portion only of the yarn, or thread used, it is sealed up, or fastened on to prevent its getting to any other part of the fabric, and, second, the fabric is made thick, as by belt weaving, or braiding, in many instances approaching the thickness of the bearing, and in all instances, putting a thick non-cleaving body between the bearing surface and the nearest point made by the binding material.

While the use of either expedient will avoid the troubles of the past, both will ordinarily be found of advantage.

Other and further objects and advantages of the invention will appear from the following description, taken in connection with the accompanying drawings, in which—

Fig 1 is a plan view of one side of a strip, sheet or fabric which is employed in molding the bearing;

Fig. 2 is a section on the line 2—2 of Fig. 1 on a slightly enlarged scale;

Fig. 3 is a longitudinal section of a fabricated strip showing a modified form of the woven material;

Fig. 4 is a perspective view of a molded cylinder which is adapted to be divided to form a plurality of bearings;

Fig. 5 is a perspective view of one of the molded bearings;

Fig. 6 is a perspective view of a fabricated sheet showing in dotted lines a cylinder which may be formed from a strip severed transversely to the sheet;

Fig. 7 is a perspective view of the completed bearing after it is molded and severed;

Fig. 8 is a view somewhat similar to Fig. 6 and showing in dotted lines, a form from two turns of a length extending longitudinally of the strip;

Fig. 9 shows a modified form of cylinder made from a length of the strip, the ends of which are cut on the bias;

Fig. 10 shows a further modified form of the fabric wound in the form of a helix for constituting the reinforcing material of the bearing and showing the same square in cross-section;

Fig. 11 is a section on the line 11—11 of Fig. 10;

Fig. 12 is a view similar to Fig. 10, but showing the cylinder as being made from a strip of braided material, circular in cross-section and wound in the form of a helix;

Fig. 13 is a cross-section of a mold used in making the bearing and shown more or less diagrammatically;

Fig. 14 is a diagrammatic view of a vat used in certain of the strands of the strip, sheet or fabric used in the making of the composition bearings; and

Fig. 15 is a longitudinal section of a pair of fabrics used in making a bearing.

But these specific illustrations and the corresponding description are used for the purpose of disclosure only, claims being drafted to cover the invention whether embodied in these or other forms.

Referring now to the drawings, 10 indicates a portion of a strip, sheet or fabric from which the bearing is adapted to be made. This sheet comprises the warp threads, strands or yarns 11 and the weft or woof threads, strands or yarns 12. This fabric is comparatively thick, as shown on a more or less enlarged scale in Fig. 2. Thicknesses from one-sixteenth to three-eighths inch give satisfactory results. It may be of such thickness that only one ply or layer is sufficient to constitute the foundation or skeleton of the bearing, as indicated in dotted lines at 13 in Fig. 6, or two or more plies or layers may be employed as shown diagrammatically in dotted lines at 14 in Fig. 8.

In the construction of the foundation strip, or reinforcing sheet, or fabric, certain of the strands are given special treatment before they are woven into the fabric.

In the form of the construction shown in Fig. 2, each alternate strand of the warp is given this treatment, but any number of strands of either the warp or woof or of both may be so treated.

The strand or yarn 11 may be treated in any one of several different methods. As one example, the strand or thread may be drawn through a vat 15 containing a liquid binder having graphite particles in suspension. The liquid material when dry constitutes a temporary binder for retaining the graphite on the strand until the second coat is applied. This method has the advantage of impregnating the thread to a certain extent with particles of graphite.

The liquid bath may be of any suitable composition. Phenol-formaldehyde varnish, fifty percent (50%) solid and thinned by twenty percent (20%) of a solvent such as alcohol or naphtha, or both, with ten (10%) to twenty percent (20%) finely ground graphite added, gives satisfactory results. When more lubricant is desired, the graphite may be increased. After the coat has partially or wholly dried, the lubricated thread is coated with a varnish or adhesive for retaining the graphite on the thread during the subsequent operations. This may be accomplished in any appropriate manner as by drawing the thread again through a vat containing a varnish or adhesive. The same resin without graphite gives a satisfactory coating. The main object is to apply the graphite and make it stay and that may be done in various ways.

This coat is then dried which may be done mechanically as by a fan, if desired. The strand has now an inner coat 17 of graphite and a binder (Fig. 2) and an outer adhesive coat 18 that envelops the graphite coat, thereby retaining the graphite on the strand. This is considered an important feature of the invention. This method may be repeated as often as desired, thereby building up as many layers or coats of graphite on the thread as may be deemed expedient or desirable. In some instances, the layer of graphite may be sufficiently held in place by the first adhesive coat without adding an additional coat of adhesive. The strand is then ready to be woven into the strip or fabric 10 in the usual manner.

If desired, the treating of the threads and weaving operations may be continuous, in which event, means are provided for artificially drying the strands while they are traveling from one place of treatment to another.

Another method of treating the threads is to draw the same through a vat containing a liquid binder or adhesive such, for instance, as a solution containing synthetic resin, and then while the thread is still sticky or tacky, draw it through dry powdered graphite which will adhere to the thread and be held thereon by the binder or adhesive and when dry, the graphite will be firmly held to the thread. It may now be woven into the fabric as described above. If desired, the coated thread may be again run through the bath to cover it with a second and even additional coats, in which event, the coated strand or thread should preferably, though not necessarily, be run through a bath of the resin not containing graphite, as in the process described above.

The strands of the thread may be treated separately in any of the methods outlined above before the same are twisted into the thread. The thread may then, if desired, be given a protecting coat or be used without it as in the previous construction.

The strands may be of any suitable material, as for instance, asbestos, cotton, wool, hemp, flax or other fibrous material, depending to a certain extent on the condition of service to which the bearing will be subjected. If of asbestos, the fiber may be twisted or wound about a wire for reinforcing the strand as is usual in such constructions.

After the weaving operation, the fabricated material may be, and preferably is, impregnated with a carbonaceous plastic material, as synthetic resin, by drawing the same through a vat containing such material in liquid form, or, if desired, it may be placed directly in the mold with the desired amount of synthetic resin.

In molding the bearing, lengths of the woven material are cut and placed in the mold 22, shown more or less diagrammatically in Fig. 13, along with carbonaceous plastic material, after which, by the addition of heat and moisture, the mass is molded into a unitary bearing structure, as shown in Fig. 4. The lengths cut from the sheets may extend cross-wise of the sheet, as shown in Fig. 6, or they may extend lengthwise of the sheet, as shown at 23 in Fig. 8, or they may be cut on the bias. In the first case, the warp strands will extend parallel with the axis of the bearing; in the second, circumferentially thereof; and, in the third, diagonally across the bearing. Preferably, though not necessarily, the lubricated strands will extend parallel with the bearing axis or diagonally across the same in order to apply the lubricant uniformly to the journal throughout its length.

In Fig. 13 is shown more or less diagrammatically a mold 22 for molding the bearings. The form of the mold shown in this figure comprises a hollow mold block 23a, having cavities 25 for steam for heating the mold, and a removable end block 26 having a central boss 27 which may be tapered to make a steam-tight joint. A core block 28 has a recess 29 in its lower portion engaging over the boss 27 for positioning the core member. The upper portion of the core block is hollow as at 31 for receiving steam for heating the interior of the mold. The annular space 32 in the mold block about the core constitutes the mold cavity in which the material to be molded is inserted. An annular plunger 33 is provided for applying the required pressure to the heated material. In this form of mold, the molded bearings will be cylindrical, as shown at 39 in Fig. 4. They could, however, be such as to mold a section only of any desired form of the bearing as shown at 41 in Fig. 5. The heat and pressure treatment causes the carbonaceous material to become plastic, permeating the woven fabric and enclosing the same in an envelope. The material will firmly adhere to all the strands, except, possibly, the lubricated ones, thereby forming a unitary molded bearing of a permanent character. After the strip 10 has been molded, it may be split longitudinally to form two or more bearings. Preferably one of the slits will be between the ends of the original fabric when the original fabric is rectangular. Where the ends of the original strip of fabric are cut on the bias, as at 30, with the side edges of the fabric meeting in a diagonal line, as shown at 33a on the roll 24 in Fig. 9, or overlapped and scarfed, as shown at 35 and 36 on the roll 37 in Fig. 8, it is immaterial where the slits are made to divide the roll so long as they are parallel with the axis of the bearing.

The strip of fabricated structure 42 may be narrow as shown in Fig. 10, in which event the same may be wound spirally about the core 28 or prewound to form a cylinder 43.

In this form of construction, certain of the warp threads may be lubricated since they will extend diagonally across the journal in the finished bearings, thereby insuring proper lubrication throughout the length of the bearing. Instead of using the woven fabric for the foundation member of the bearing, the strip may be braided, as shown at 40 in Fig. 12. Where a braided strip is employed, certain of the strands of the braided material may be lubricated in the manner disclosed above before the braiding operation. Likewise, in the case of circular weaving or braiding, any of the threads extending in either or both directions may be treated before the weaving operation. In certain types of woven material, such, for instance, as that known as solid weaving, a section of which is shown diagrammatically at 47 in Fig. 3, the parts of the weave are held together by tie threads or strands 48. In this type of weave, the tie threads 48 may be lubricated instead of, or in addition to, the warp or woof threads. In the type of bearings used on journals depending on water lubrication and in which strands of asbestos are used in the foundation material of the bearing, it may be desirable to introduce cotton strands for carrying the lubrication. By means of this arrangement, the cotton fiber will absorb the water by capillarity, thereby causing the strand to expand and forcing the lubricating material carried thereby against the journal for lubricating the same.

The bearings may be molded with two or more ply of the fabricated structure, if desired. The coarseness of the strands results in such a roughening of the surface that the adjacent surfaces will be interlocked with each other and with the binder that slipping of one ply on another will be prevented.

In Fig. 15 is shown a fabric that is especially adapted to be used in two or more ply in making bearings. As shown, the fabric 44 comprises a warp of threads or strands 45, relatively small in diameter, and relatively thick woof threads 46. The surface of the fabric would be not unlike a corrugated surface or a washboard and when two such surfaces are placed together, the corrugations would interlock as shown in Fig. 15.

Furthermore, since each ply is thick, it will have sufficient strength to prevent buckling and consequently the engagement of the ends of the plies of one section of the bearing against the adjacent section will prevent the plies moving relative to each other.

Under certain conditions, as for instance, when the bearings are used on large rolls, for roller mills, and water lubrication is employed, the upper roll may tend to overrun when the work passes from the rolls. In order to remedy this defect, a small amount of a suitable friction creating material may be mixed with the resin in making the lower bearing for the upper roll. A suitable abrasive or a substance more or less tacky may be employed for this purpose. This small amount of friction creating material will constitute somewhat of a drag on the rotation of the roll when it is supported on this bearing.

While in certain figures of the drawings the weave is shown more or less open, this showing is for illustrative purposes only, as in practice the material is more closely woven.

It is thought from the foregoing taken in connection with the accompanying drawings that the construction and operation of my device will be apparent to those skilled in the art and that changes in size, shape, proportion and details of construction may be made without departing from the spirit and scope of the appended claims.

I claim as my invention:—

1. A self-lubricating molded bearing comprising a composition material of synthetic resin reinforced by a fabricated member of flexible strands of fibrous material having certain only of its strands covered by a lubricant encircled by an adhering protective coat of synthetic resin and having the remainder of its strands coated with synthetic resin only, whereby said last named strands are securely bonded together and hold said first named strands securely in position between them.

2. A self-lubricating molded bearing comprising a composition material of synthetic resin reinforced by a fabricated member of flexible strands of fibrous material having certain only of its strands covered by graphite encircled by an adhering protective coat of synthetic resin and having the remainder of its strands coated with synthetic resin only, whereby said last named strands are securely bonded together and hold said first named strands securely in position between them.

THOMAS L. GATKE.